United States Patent
Dar et al.

(10) Patent No.: US 12,333,144 B2
(45) Date of Patent: Jun. 17, 2025

(54) SYSTEM AND METHOD FOR DISTRIBUTED INPUT/OUTPUT (IO) PERFORMANCE FORECASTING ACROSS MULTIPLE MACHINE LEARNING MODELS

(71) Applicant: Dell Products L.P., Round Rock, TX (US)

(72) Inventors: Shaul Dar, Petach Tikva (IL); Ramakanth Kanagovi, Bengaluru (IN); Vamsi Vankamamidi, Hopkinton, MA (US); Guhesh Swaminathan, Tamil Nadu (IN); Swati Smita Sitha, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 17/869,919

(22) Filed: Jul. 21, 2022

(65) Prior Publication Data
US 2024/0028203 A1    Jan. 25, 2024

(51) Int. Cl.
*G06F 3/00* (2006.01)
*G06F 3/06* (2006.01)

(52) U.S. Cl.
CPC .......... *G06F 3/061* (2013.01); *G06F 3/0629* (2013.01); *G06F 3/0683* (2013.01); *G06F 3/0607* (2013.01)

(58) Field of Classification Search
None
See application file for complete search history.

(56) References Cited

U.S. PATENT DOCUMENTS

| | | | |
|---|---|---|---|
| 2021/0365215 A1* | 11/2021 | Yang | G06N 20/00 |
| 2023/0052811 A1* | 2/2023 | Hua | G06F 11/1425 |
| 2024/0028212 A1* | 1/2024 | Hua | G06F 3/0631 |
| 2024/0143174 A1* | 5/2024 | Dar | G06F 3/0653 |

* cited by examiner

*Primary Examiner* — Midys Rojas
(74) *Attorney, Agent, or Firm* — Brian J. Colandreo; Heath M. Sargeant; Holland & Knight LLP

(57) ABSTRACT

A method, computer program product, and computing system for processing a plurality of input/output (IO) operations on a plurality of storage objects of a storage system. The plurality of storage objects may be divided into a plurality of storage object groups based upon, at least in part, the plurality of IO operations processed on the plurality of storage objects. Each storage object group may be associated with an IO machine learning model selected from a plurality of IO machine learning models, thus defining a plurality of storage object group-specific IO machine learning models. IO performance data may be forecasted for the plurality of storage objects using the plurality of storage object group-specific IO machine learning models.

20 Claims, 10 Drawing Sheets

SYSTEM AND METHOD FOR DISTRIBUTED INPUT/OUTPUT (IO) PERFORMANCE FORECASTING ACROSS MULTIPLE MACHINE LEARNING MODELS

BACKGROUND

The ability to accurately forecast the activity pattern of storage objects such as files, volumes, or extents, in a storage system, can enable significant performance gains. Such forecasting of the general level of activity of the storage object is often referred to as the "temperature" of the storage object, where an active storage object is considered "hot" and an inactive object is considered "cold". The temperature may be defined in terms of the number of IO operations performed by the storage object in a given time unit, the total number of bytes transferred, or some combination of similar metrics. However, conventional approaches to forecasting performance data use predefined models or particular IO modeling systems on the entirety of a storage system (i.e., a single model is applied to each storage object of the storage system). These conventional approaches are unable to account for the application of specialized machine learning models on particular portions of the storage system that experience distinct IO performance characteristics.

SUMMARY OF DISCLOSURE

In one example implementation, a computer-implemented method executed on a computing device may include, but is not limited to, processing a plurality of input/output (IO) operations on a plurality of storage objects of a storage system. The plurality of storage objects may be divided into a plurality of storage object groups based upon, at least in part, the plurality of IO operations processed on the plurality of storage objects. Each storage object group may be associated with an IO machine learning model selected from a plurality of IO machine learning models, thus defining a plurality of storage object group-specific IO machine learning models. IO performance data may be forecasted for the plurality of storage objects using the plurality of storage object group-specific IO machine learning models.

One or more of the following example features may be included. Processing the plurality of IO operations may include determining IO-related statistics associated with the plurality of storage objects. Dividing the plurality of storage objects into the plurality of storage object groups may include dividing the plurality of storage objects into the plurality of storage object groups using a first machine learning model. Dividing the plurality of storage objects into the plurality of storage object groups may include grouping the plurality of storage objects based upon, at least in part, one or more attributes associated with the plurality of storage objects. Dividing the plurality of storage objects into the plurality of storage object groups may include dividing the plurality of storage objects into the plurality of storage object groups based upon, at least in part, a plurality of IO workloads from the plurality of IO operations processed on the plurality of storage objects. Dividing the plurality of storage objects into the plurality of storage object groups may include clustering a plurality of IO workloads from the plurality of IO operations processed on the plurality of storage objects. Forecasting IO performance data for the plurality of storage objects may include forecasting IO temperature for the plurality of storage objects.

In another example implementation, a computer program product resides on a computer readable medium that has a plurality of instructions stored on it. When executed by a processor, the instructions cause the processor to perform operations that may include, but are not limited to, processing a plurality of input/output (IO) operations on a plurality of storage objects of a storage system. The plurality of storage objects may be divided into a plurality of storage object groups based upon, at least in part, the plurality of IO operations processed on the plurality of storage objects. Each storage object group may be associated with an IO machine learning model selected from a plurality of IO machine learning models, thus defining a plurality of storage object group-specific IO machine learning models. IO performance data may be forecasted for the plurality of storage objects using the plurality of storage object group-specific IO machine learning models.

One or more of the following example features may be included. Processing the plurality of IO operations may include determining IO-related statistics associated with the plurality of storage objects. Dividing the plurality of storage objects into the plurality of storage object groups may include dividing the plurality of storage objects into the plurality of storage object groups using a first machine learning model. Dividing the plurality of storage objects into the plurality of storage object groups may include grouping the plurality of storage objects based upon, at least in part, one or more attributes associated with the plurality of storage objects. Dividing the plurality of storage objects into the plurality of storage object groups may include dividing the plurality of storage objects into the plurality of storage object groups based upon, at least in part, a plurality of IO workloads from the plurality of IO operations processed on the plurality of storage objects. Dividing the plurality of storage objects into the plurality of storage object groups may include clustering a plurality of IO workloads from the plurality of IO operations processed on the plurality of storage objects. Forecasting IO performance data for the plurality of storage objects may include forecasting IO temperature for the plurality of storage objects.

In another example implementation, a computing system includes at least one processor and at least one memory architecture coupled with the at least one processor, wherein the at least one processor is configured to process a plurality of input/output (IO) operations on a plurality of storage objects of a storage system. The plurality of storage objects may be divided into a plurality of storage object groups based upon, at least in part, the plurality of IO operations processed on the plurality of storage objects. Each storage object group may be associated with an IO machine learning model selected from a plurality of IO machine learning models, thus defining a plurality of storage object group-specific IO machine learning models. IO performance data may be forecasted for the plurality of storage objects using the plurality of storage object group-specific IO machine learning models.

One or more of the following example features may be included. Processing the plurality of IO operations may include determining IO-related statistics associated with the plurality of storage objects. Dividing the plurality of storage objects into the plurality of storage object groups may include dividing the plurality of storage objects into the plurality of storage object groups using a first machine learning model. Dividing the plurality of storage objects into the plurality of storage object groups may include grouping the plurality of storage objects based upon, at least in part, one or more attributes associated with the plurality of storage objects. Dividing the plurality of storage objects into the plurality of storage object groups may include dividing the plurality of storage objects into the plurality of storage object groups based upon, at least in part, a plurality of IO workloads from the plurality of IO operations processed on the plurality of storage objects, dividing the plurality of storage objects into the plurality of storage object groups may include clustering a plurality of IO workloads from the plurality of IO operations processed on the plurality of storage objects. Forecasting IO performance data for the plurality of storage objects may include forecasting IO temperature for the plurality of storage objects.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
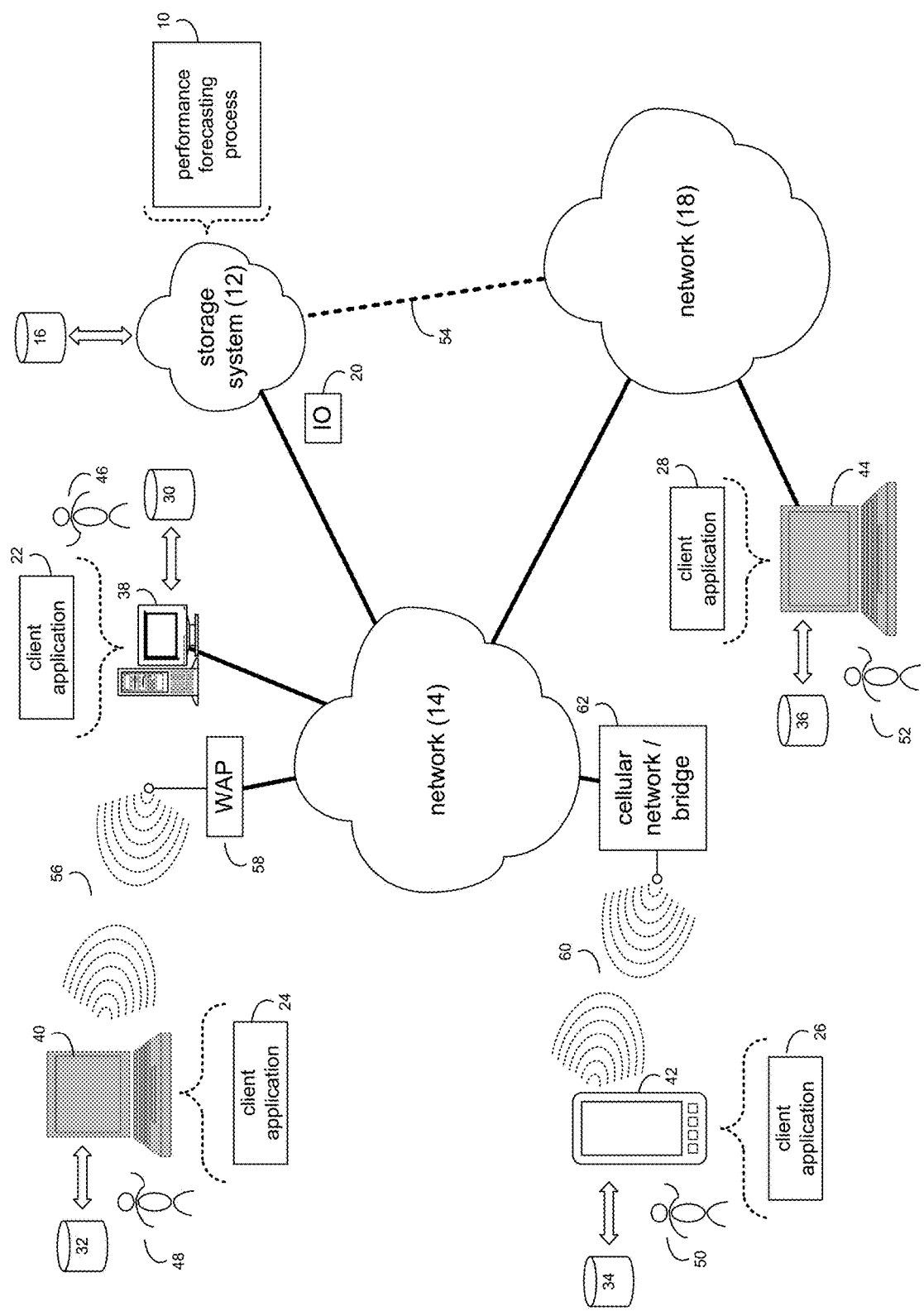
FIG. 1 is an example diagrammatic view of a storage system and a performance forecasting process coupled to a distributed computing network according to one or more example implementations of the disclosure.

System Overview:

Referring to FIG. 1, there is shown performance forecasting process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of performance forecasting process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of performance forecasting process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a performance forecasting process, such as performance forecasting process 10 of FIG. 1, may include but is not limited to, processing a plurality of input/output (ID) operations on a plurality of storage objects of a storage system. The plurality of storage objects may be divided into a plurality of storage object groups based upon, at least in part, the plurality of IO operations processed on the plurality of storage objects. Each storage object group may be associated with an IO machine learning model selected from a plurality of IO machine learning models, thus defining a plurality of storage object group-specific IO machine learning models. IO performance data may be forecasted for the plurality of storage objects using the plurality of storage object group-specific IO machine learning models.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
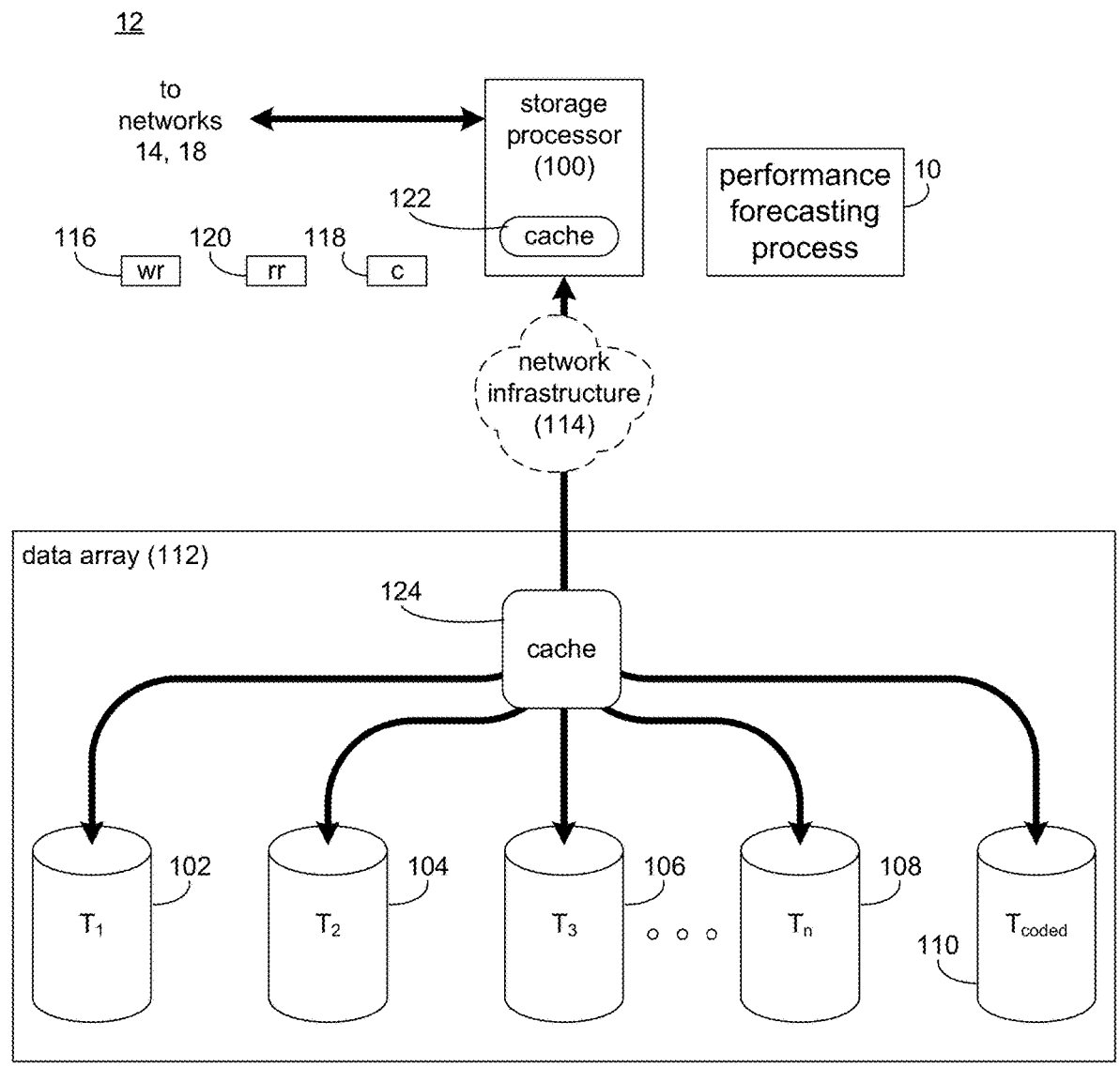
FIG. 2 is an example diagrammatic view of the storage system of FIG. 1 according to one or more example implementations of the disclosure.
Figure 3:
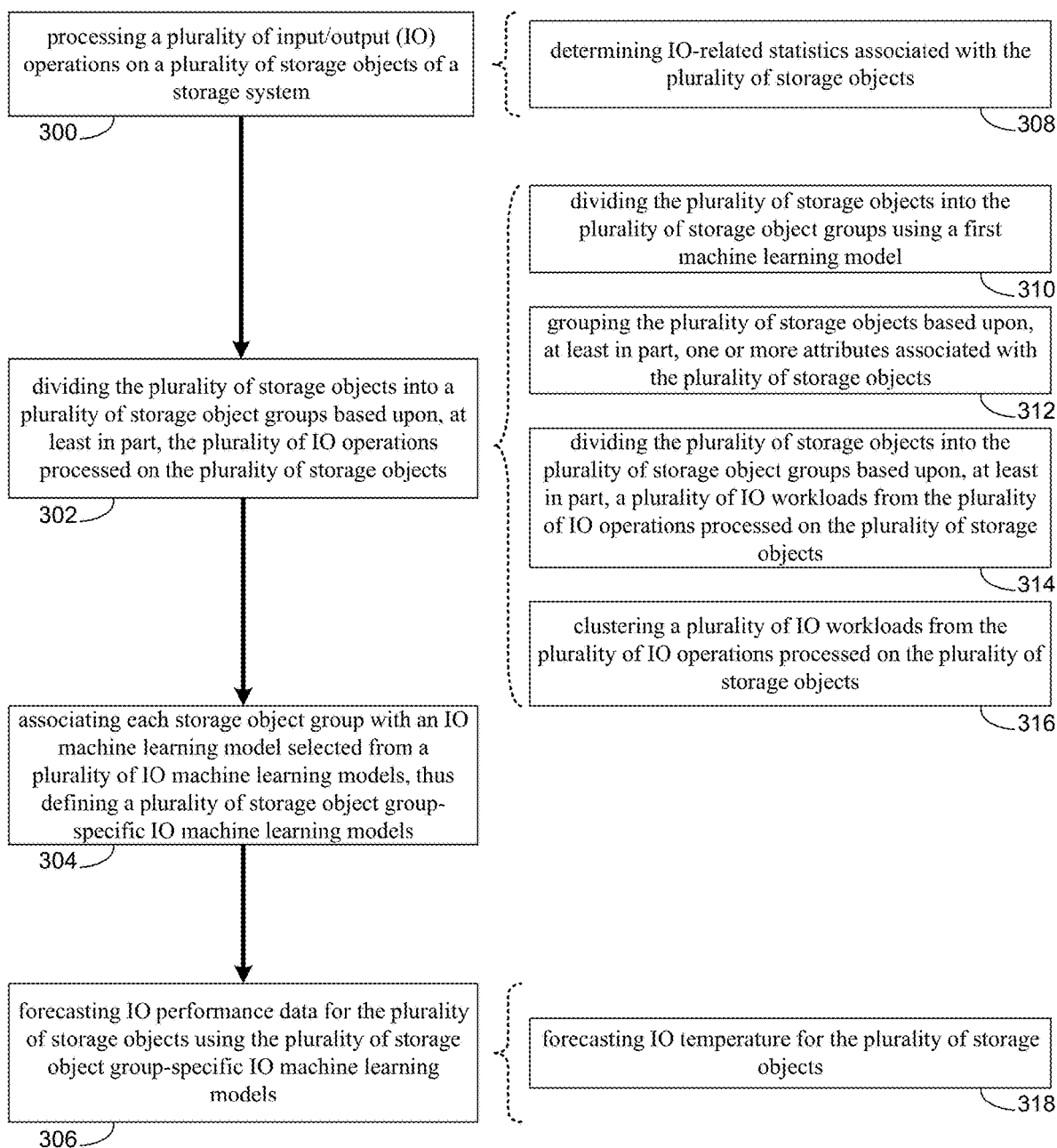
FIG. 3 is an example flowchart of performance forecasting process according to one or more example implementations of the disclosure.
Figure 4:
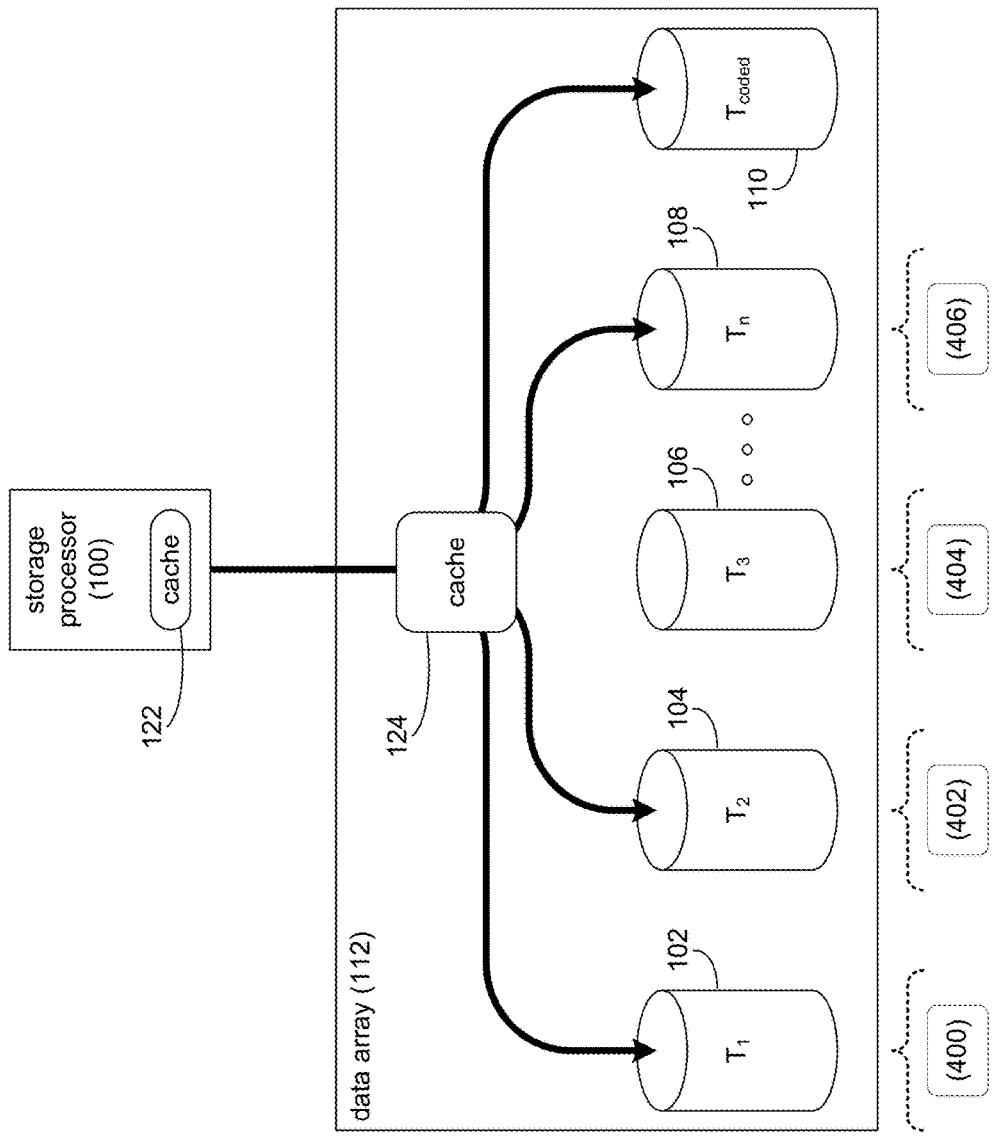
FIG. 4 is an example diagrammatic view of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of performance forecasting process 10. The instruction sets and subroutines of performance forecasting process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of performance forecasting process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of performance forecasting process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of performance forecasting process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Performance Forecasting Process:

Referring also to the examples of FIGS. 3-10 and in some implementations, performance forecasting process 10 may process 300 a plurality of input/output (IO) operations on a plurality of storage objects of a storage system. The plurality of storage objects may be divided 302 into a plurality of storage object groups based upon, at least in part, the plurality of IO operations processed on the plurality of storage objects. Each storage object group may be associated 304 with an IO machine learning model selected from a plurality of IO machine learning models, thus defining a plurality of storage object group-specific IO machine learning models. IO performance data may be forecasted 306 for the plurality of storage objects using the plurality of storage object group-specific IO machine learning models.

As will be discussed in greater detail below, implementations of the present disclosure may allow for improved performance forecasting for storage system. For example, the ability to accurately forecast the activity pattern of storage objects such as files, volumes, or extents, in a storage system, can enable significant performance gains. For example, it can help in better tiering and caching in a storage array; tuning policies related to retention or prefetching; the timing of operations such as backup or replication; load balancing across a storage cluster; and/or guiding data placement and movement in a cloud or combined on-premises and cloud environment. Such characterization of the general level of activity of the storage object is often referred to as the "temperature" of the storage object, where an active storage object is considered "hot" and an inactive object is considered "cold". The temperature may be defined in terms of the number of IO operations performed by the storage object in a given time unit, the total number of bytes transferred, or some combination of similar metrics. The characterization can also be related to more specific aspects of the activity such as read vs write patterns, time-related (e.g. seasonal) behavior, etc. However, conventional approaches to forecasting performance data use predefined models or particular IO modeling systems on the entirety of a storage system (i.e., a single model is applied to each storage object of the storage system). These conventional approaches are unable to account for the application of specialized machine learning models on particular portions of the storage system. As will be discussed in greater detail below, implementations of the present disclosure may divide the storage system in multiple storage object groups and may forecast IO performance for each storage object group using a specialized machine learning model. In this manner, implementations of the present disclosure may achieve better accuracy, and accordingly, may enable significant performance gains for the operation of the storage system (i.e., by more effectively utilizing the resources of the storage system in response to the IO operations performed on the storage system).

In some implementations, performance forecasting process 10 may process 300 a plurality of input/output (IO) operations on a plurality of storage objects of a storage system. For example and referring also to FIG. 4, during the operation of a storage system (e.g., storage system 12), IO operations may be generated for processing data on various storage objects (e.g., storage objects 400, 402, 404, 406). Storage objects (e.g., storage objects 400, 402, 404, 406) may generally include any container or storage unit configured to store data within a storage system (e.g., storage system 12). For example, a storage object may be any one of the following: a volume (aka Logical Unit Number (LUN)), a file, or parts thereof that may be defined e.g. by offsets or address ranges (e.g., sub-LUNs, disk extents, and/or slices). As will be discussed in greater detail below, each storage object may be accessed at different rates under distinct loads than other storage objects during the processing of IO requests.

Processing 300 the plurality of IO operations may include determining 308 IO-related statistics associated with the plurality of storage objects. For example, performance forecasting process 10 may update IO-related statistics associated with each storage object as IO operations are processed on the storage system. The IO-related statistics may generally include host IO metrics that represent the IO processing performance for a storage system. Examples of IO-related statistics may include, but are not limited to, latency, read input/outputs per second (IOPS), write IOPS, total IOPS, bandwidth, timestamps, hosts, offset in logical address space, length of IO operation, and/or pattern characteristics (e.g., sequential, random, caterpillar, IO-stride, etc.). As will be discussed in greater detail below, IO performance data (e.g., in terms of latency, read IOPS, write IOPS, total IOPS, bandwidth, etc.) may be forecast for storage objects using specialized IO machine learning models selected for particular groups of storage objects.

In some implementations, performance forecasting process 10 may divide 302 the plurality of storage objects into a plurality of storage object groups based upon, at least in part, the plurality of IO operations processed on the plurality of storage objects. For example and referring again to FIG. 4, suppose that storage system 12 includes a plurality of storage objects (e.g., storage objects 400, 402, 404, 406). While this example includes e.g., four storage objects, it will be appreciated that this is for example purposes only and that any number of storage objects may be used within the scope of the present disclosure. Performance forecasting process 10 may process 300 IO operations (e.g., IO operations 500, 502, 504) on the storage system and may generate IO-related statistics. These IO-related statistics may be utilized to divide 302 each storage object into a storage object group. A storage object group may include a subset of the plurality of storage objects based upon, at least in part, the IO-related statistics associated with the plurality of storage objects determined from the plurality of IO operations processed on the storage system. For example, suppose that storage object 400 is accessed in a manner described by a first set of IO-related statistics (e.g., first set of IO-related statistics 506); storage object 402 is accessed in a manner described by a second set of IO-related statistics (e.g., second set of IO-related statistics 508); storage object 404 is accessed in a manner described by a third set of IO-related statistics (e.g., third first set of IO-related statistics 510); and storage object 406 is accessed in a manner described by a fourth set of IO-related statistics (e.g., fourth set of IO-related statistics 512). In this example and as will be discussed in greater detail below, performance forecasting process 10 may utilize each set of IO-related statistics (e.g., IO-related statistics 506, 508, 510, 512) to divide 302 the plurality of storage objects (e.g., storage objects 400, 402, 404, 406) into a plurality of storage object groups (e.g., storage object groups 514, 516, 518, 520).

Dividing 302 the plurality of storage objects into the plurality of storage object groups may include dividing 310 the plurality of storage objects into the plurality of storage object groups using a first machine learning model. As is known in the art, a machine learning system or model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the machine learning model is provided feedback that's analogous to rewards, which it tries to maximize. While three examples of machine learning approaches have been provided, it will be appreciated that other machine learning approaches are possible within the scope of the present disclosure.

Figure 5:
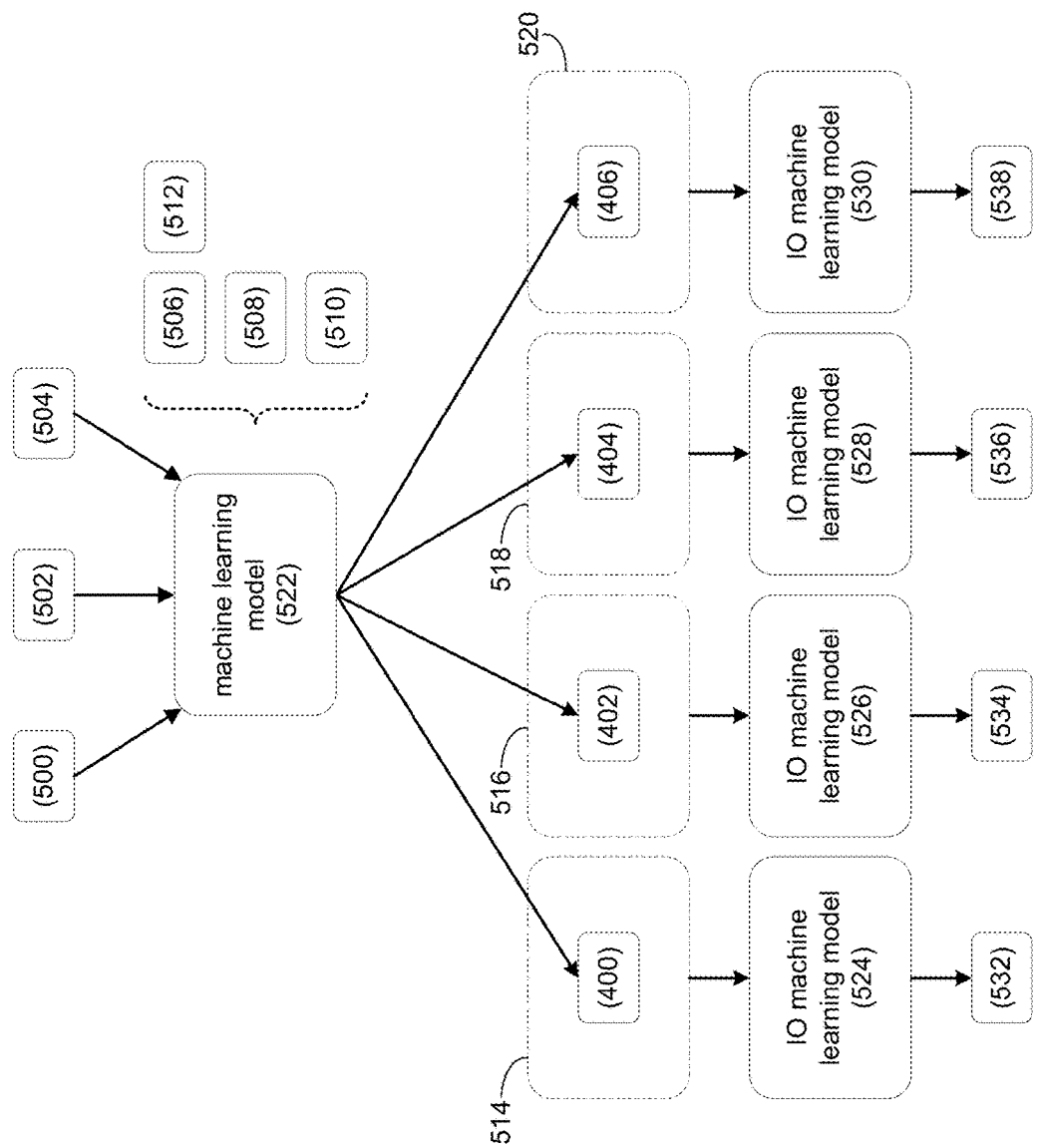
FIG. 5 is an example diagrammatic view of the performance forecasting process according to one or more example implementations of the disclosure.

Referring also to FIG. 5, performance forecasting process 10 may utilize a hierarchical supervised machine learning model (e.g., machine learning model 522) to divide 310 the plurality of storage objects (e.g., storage objects 400, 402, 404, 406) into the plurality of storage object groups (e.g., storage object groups 514, 516, 518, 520). For example, machine learning model 522 may process the plurality of IO operations (e.g., IO operations 500, 502, 504) and/or the IO-related statistics (e.g., IO-related statistics 506, 508, 510, 512) to divide storage objects 400, 402, 404, 406 into storage object groups 514, 516, 518, 520.

Dividing 302 the plurality of storage objects into the plurality of storage object groups may include grouping 312 the plurality of storage objects based upon, at least in part, one or more attributes associated with the plurality of storage objects. For example, performance forecasting process 10 may group 312 or "bucketize" the plurality of storage objects along one or more continuous attributes, such as the level of activity, date, average IO size, or discrete/class attributes, such as read versus write IO requests and/or the host from which the IO requests originate. Suppose that storage system 12 includes a plurality of storage objects with varying read and write bandwidth values. In this example, performance forecasting process 10 may divide 312 the plurality of storage objects into a plurality of storage object groups or "buckets" based on log values, which provides standardization across each bucket, as shown below in Table 1:

TABLE 1

| Buckets | Total Bandwidth Range | Bandwidth % |
|---------|----------------------|-------------|
| <0.5    | <3                   | 5%          |
| 0.5 to 1| 3-10                 | 16%         |
| 1 to 1.5| 10-32                | 5%          |
| 1.5 to 2| 32-100               | 9%          |
| 2 to 2.5| 100-316              | 5%          |
| 2.5 to 3| 316-1000             | 7%          |
| 3 to 3.5| 1000-3162            | 6%          |
| >3.5    | >3162                | 47%         |

In this example and as will be described in greater detail below, a plurality of IO machine learning models may be trained on each bucket or storage object group as shown above in Table 1.

Figure 6:
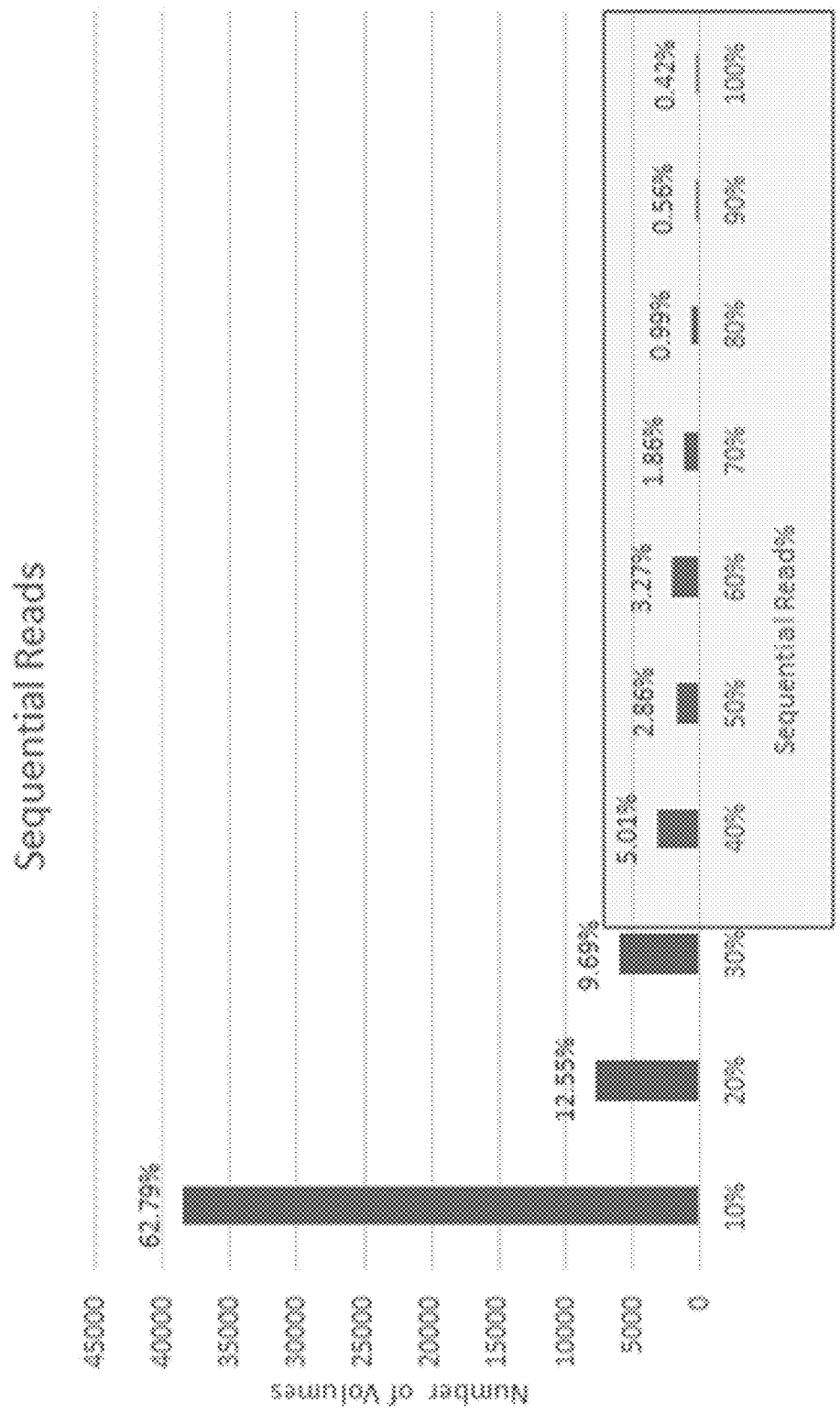
FIGS. 6-7 are example diagrammatic views of IO workloads according to one or more example implementations of the disclosure.
Figure 7:
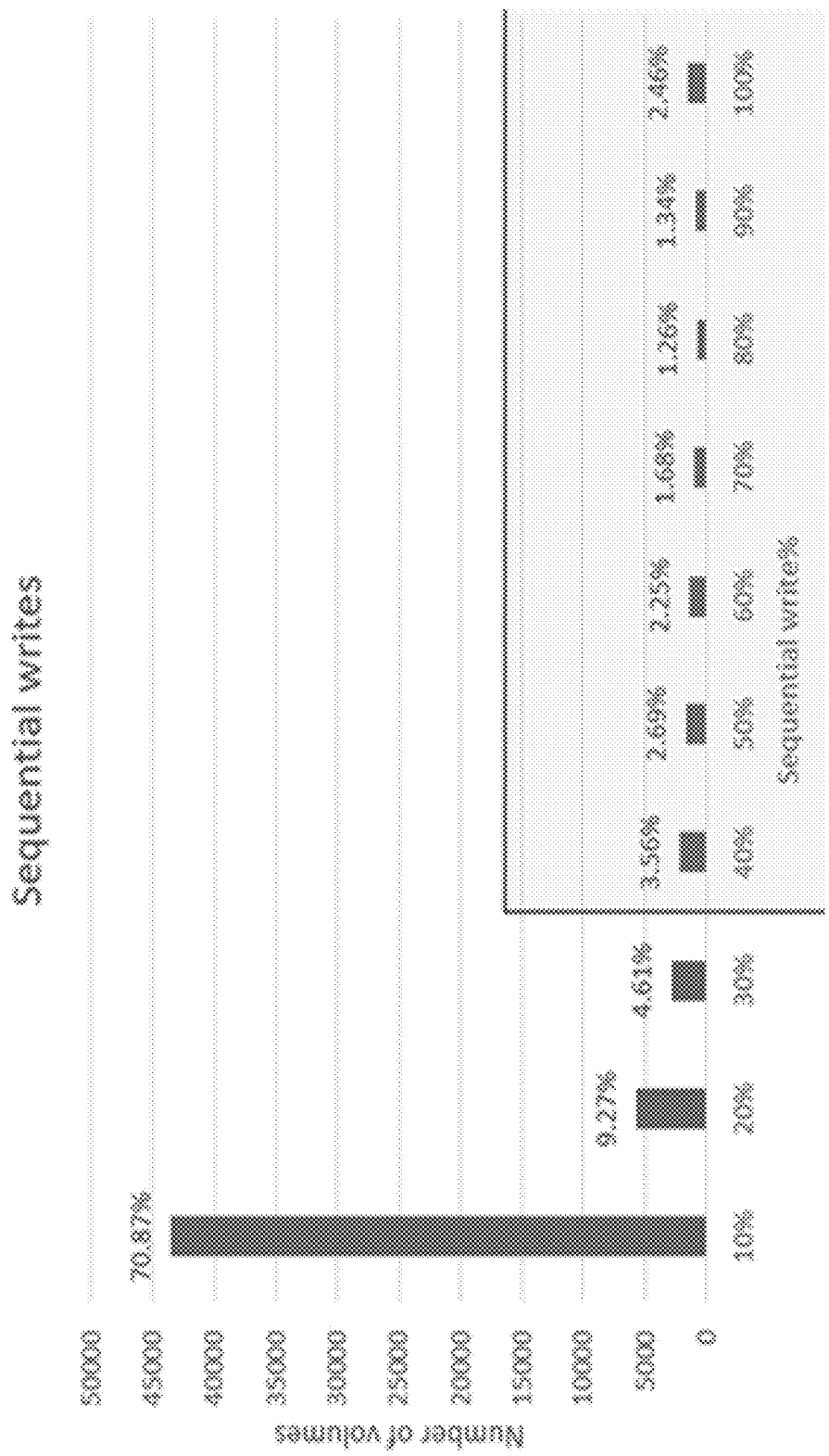

Dividing 302 the plurality of storage objects into the plurality of storage object groups may include dividing 314 the plurality of storage objects into the plurality of storage object groups based upon, at least in part, a plurality of IO workloads from the plurality of IO operations processed on the plurality of storage objects. An IO workload may generally include a collection or combination of IO operations with a particular relationship. For example, performance forecasting process 10 may divide 314 the plurality of storage objects into storage object groups for particular IO workloads (e.g., a storage object group for sequential read IO operations, a storage object group for sequential write IO operations, etc.). As shown in FIGS. 6-7, the number of sequential reads as a function of the number of volumes within the storage system and the number of sequential writes as a function of the number of volumes within the storage system are shown. The boxes or highlighting around the sequential read percentages and the sequential write percentages represent a predefined threshold of the sequential read percentages and the sequential write percentages. In this example and as will be described in greater detail below, a plurality of IO machine learning models may be trained on each IO workload (i.e., one IO machine learning model for the relatively high number of sequential read IO operations and another IO machine learning model for the relatively high number of sequential write IO operations). While an example with two types of IO workloads (i.e., sequential read IO operations and sequential write IO operations) has been provided, it will be appreciated that this is for example purposes only and that any type of or number of IO workloads may be used within the scope of the present disclosure.

Dividing 302 the plurality of storage objects into the plurality of storage object groups may include clustering 316 a plurality of IO workloads from the plurality of IO operations processed on the plurality of storage objects. For example and as discussed above, an IO workload may generally include a collection or combination of IO operations with a particular relationship. Examples of IO workloads may include sequential read IO operations, sequential write IO operations, other patterns of IO operations, percentages of read IO operations, percentages of write IO operations, number of consecutive read-read IO operations, number of read-write IO operations, etc. It will be appreciated that various types of IO workloads may be determined within the scope of the present disclosure. In some implementations, IO workloads that exhibit common characteristics may be assigned to the same cluster, making them amenable to tailored optimization policies. In one example, performance forecasting process 10 may cluster 316 (e.g., combine or aggregate) various IO workloads. For example, performance forecasting process 10 may utilize a machine learning model to cluster 316 the plurality of IO workloads into the plurality of storage object groups (e.g., storage object groups 514, 516, 518, 520). In this example, the machine learning model (e.g., machine learning model 522) may by trained to identify common characteristics across the plurality of IO workloads.

Suppose that performance forecasting process 10 divides 302 the plurality of storage objects into the plurality of storage object groups by clustering 316 the plurality of IO workloads into e.g., five clusters or storage object groups (e.g., a first storage object group with IO workloads of totally idle volumes with no IO operations; a second storage object group of IO workloads of significant IO on volumes and moderate IOPS; a third storage object group of IO workloads with heavy read operations and low IOPS; a fourth storage object group of IO workloads with fewer than 50% read IO operations and low IOPS; and a fifth storage object group of IO workloads with outlier IO performance data). In this example and as will be discussed in greater detail below, a plurality of IO machine learning models may be trained on each storage object group or cluster (i.e., a first IO machine learning model for the first storage object group; a second IO machine learning model for the second storage object group; a third IO machine learning model for the third storage object group; a fourth IO machine learning model for the fourth storage object group; and a fifth IO machine learning model for the fifth storage object group). While an example of e.g., five storage object groups or clusters has been described, it will be appreciated that this is for example purposes only and that any number of storage object groups/clusters and/or IO machine learning models may be utilized within the scope of the present disclosure.

In some implementations, performance forecasting process 10 may associate 304 each storage object group with an IO machine learning model selected from a plurality of IO machine learning models, thus defining a plurality of storage object group-specific IO machine learning models. For example and as discussed above, performance forecasting process 10 may utilize a distinct IO machine learning model for each storage object group to account for unique characteristics associated with each storage object group. In some implementations, performance forecasting process 10 may have access to a plurality of IO machine learning models (e.g., IO machine learning models 524, 526, 528, 530). As each IO machine learning model may be more accurate when forecasting IO performance for particular types of storage objects and/or storage objects with different IO workloads, performance forecasting process 10 may associate 304 each storage object group with a particular IO machine learning model. In some implementations, performance forecasting process 10 may include one or more configuration files or settings associating 304 particular IO machine learning models with specific storage object groups. Performance forecasting process 10 may provide a user interface for providing a user with the ability to manually associate 304 specific IO machine learning models with particular storage objects.

In another example, performance forecasting process 10 may cycle or rotate the plurality of IO machine learning models through the plurality of storage object groups and determine which IO machine learning model to utilize based upon, at least in part, a comparison of the IO machine learning model forecast error with that of an IO machine learning model applied generally. In this manner, performance forecasting process 10 may adaptively select IO machine learning models for storage object groups based on the accuracy of the IO performance forecast. Referring again to FIG. 5, performance forecasting process 10 may associate IO machine learning model 524 with storage object group 514; IO machine learning model 526 with storage object group 516; IO machine learning model 528 with storage object group 518; and IO machine learning model 530 with storage object group 520.

Returning to the above example of the "buckets" of Table 1, a plurality of IO machine learning models may be trained on each bucket or storage object group as shown above in Table 1. In this example, an IO machine learning model may be trained with the data from each bucket or storage object group (i.e., an IO machine learning model trained with the bucket associated with log values less than 0.5, an IO machine learning model trained with the bucket associated with log values between 0.5 and 1, etc.). In this manner, the same IO machine learning model or different IO machine learning models may be associated with and trained on data from each storage object group/bucket.

Returning to the above example of the IO workloads as shown in FIGS. 6-7 (i.e., sequential reads and sequential writes), a plurality of IO machine learning models may be trained on each IO workload (i.e., one IO machine learning model for the relatively high number of sequential read IO operations and another IO machine learning model for the relatively high number of sequential write IO operations).

In some implementations, performance forecasting process 10 may forecast 306 IO performance data for the plurality of storage objects using the plurality of storage object group-specific IO machine learning models. Forecasting IO performance data for the plurality of storage objects may generally include providing the plurality of IO operations and/or IO-related statistics to the plurality of storage object group-specific IO machine learning models to generate forecast information associated with the storage objects. As shown in FIG. 5, IO machine learning models 524, 526, 528 may forecast 306 IO performance data (e.g., IO performance data 532, 534, 536, 538) for the plurality of storage object groups (e.g., storage object groups 514, 516, 518, 520).

Forecasting 306 IO performance data for the plurality of storage objects may include forecasting 318 IO temperature for the plurality of storage objects. As discussed above, the general level of activity of the storage object may be referred to as the "temperature" of the storage object, where an active storage object is considered "hot" and an inactive object is considered "cold". The temperature may be defined in terms of the number of IO operations performed by the storage object in a given time unit, the total number of bytes transferred, or some combination of similar metrics. Accordingly, performance forecasting process 10 may forecast 318 IO temperatures (e.g., IO temperature 532, 534, 536, 538) for each storage object (e.g., storage objects 400, 402, 404, 406) using the plurality of storage object group-specific IO machine learning models (e.g., IO machine learning models 524, 526, 528, 530).

Figure 8:
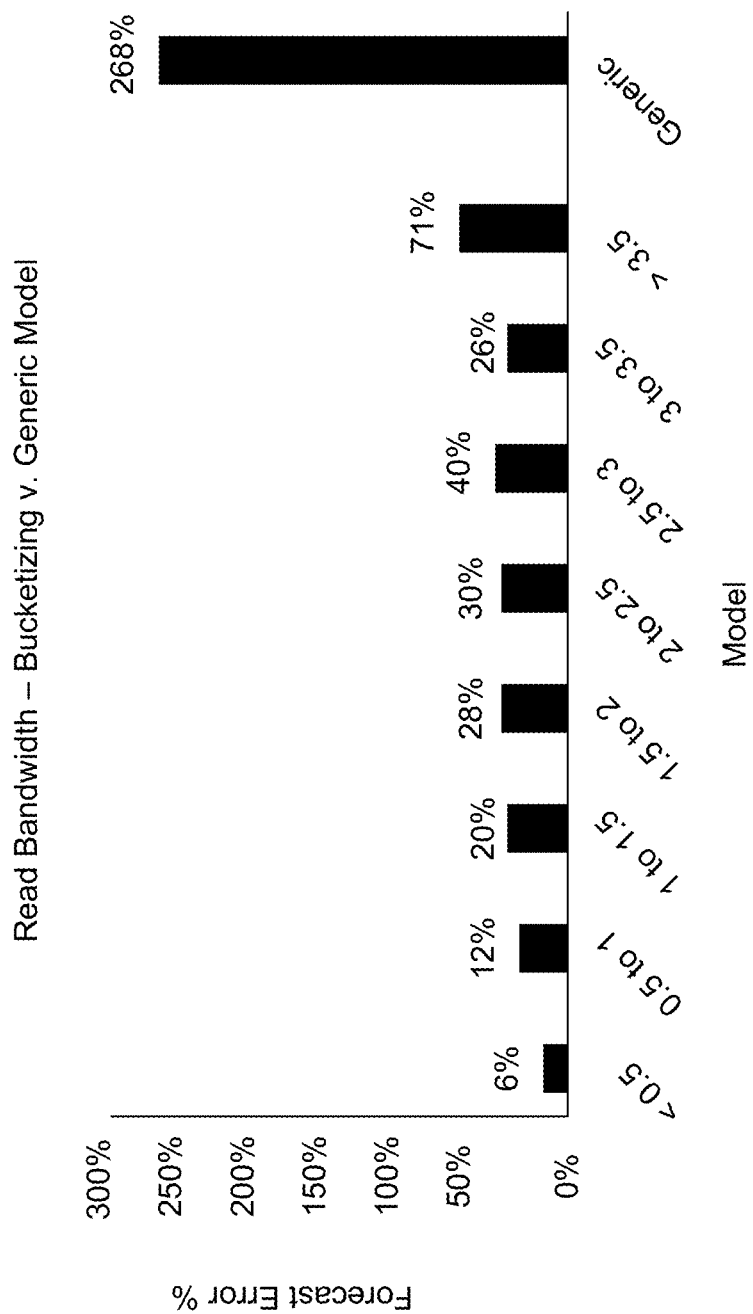
FIGS. 8-10 are example diagrammatic views of the forecasting of IO performance data using specialized IO machine learning models and generic IO machine learning models according to one or more example implementations of the disclosure.
Figure 9:
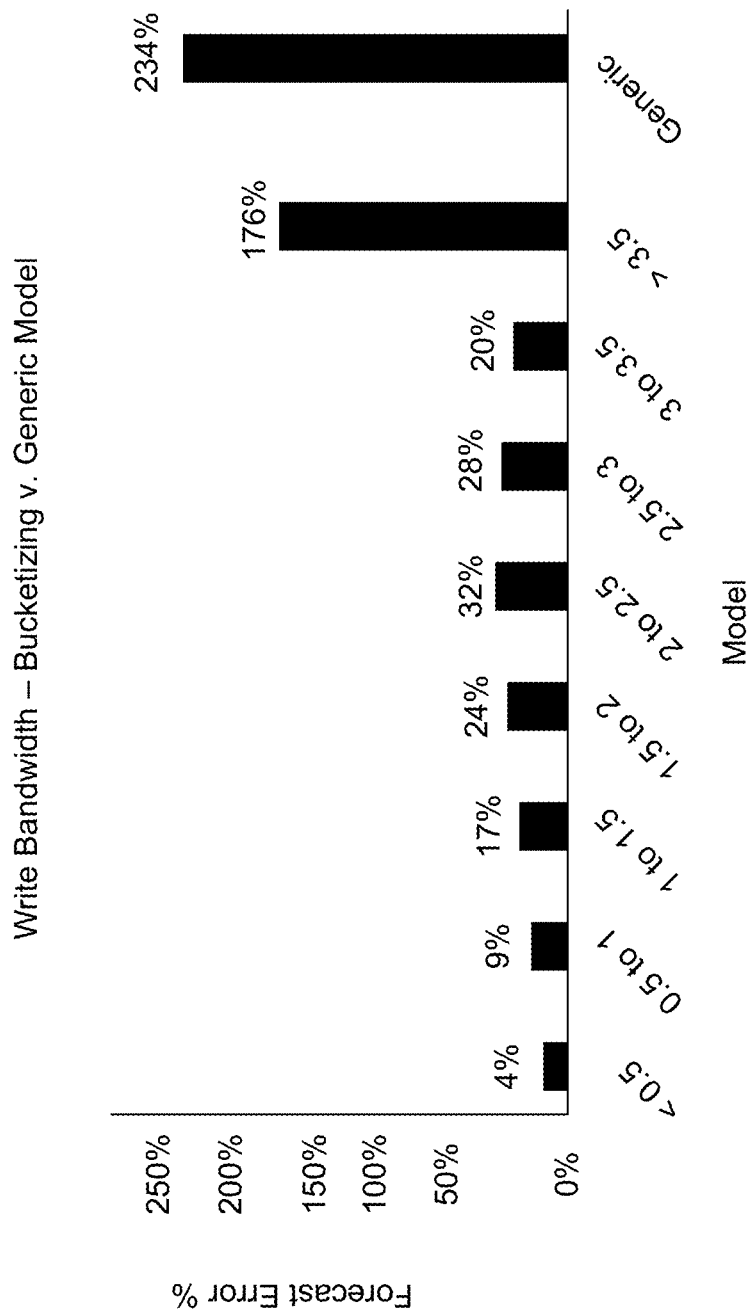

Referring again to the bucket example of Table 1 and referring also to FIGS. 8-9, performance forecasting process 10 may forecast 306 IO performance data for the storage object groups/buckets of the read bandwidth and write bandwidth. As shown in FIG. 8, the forecast error percentage is shown for each IO machine learning model (i.e., each bucket trained with an IO machine learning model). With the specialized IO machine learning models, the forecast error percentage is greatly reduced compared to the generic IO machine learning model (i.e., IO machine learning model trained over the whole storage system). In this manner, the accuracy of IO performance forecasting is improved by utilizing the plurality of IO machine learning models for each storage object group.

Figure 10:
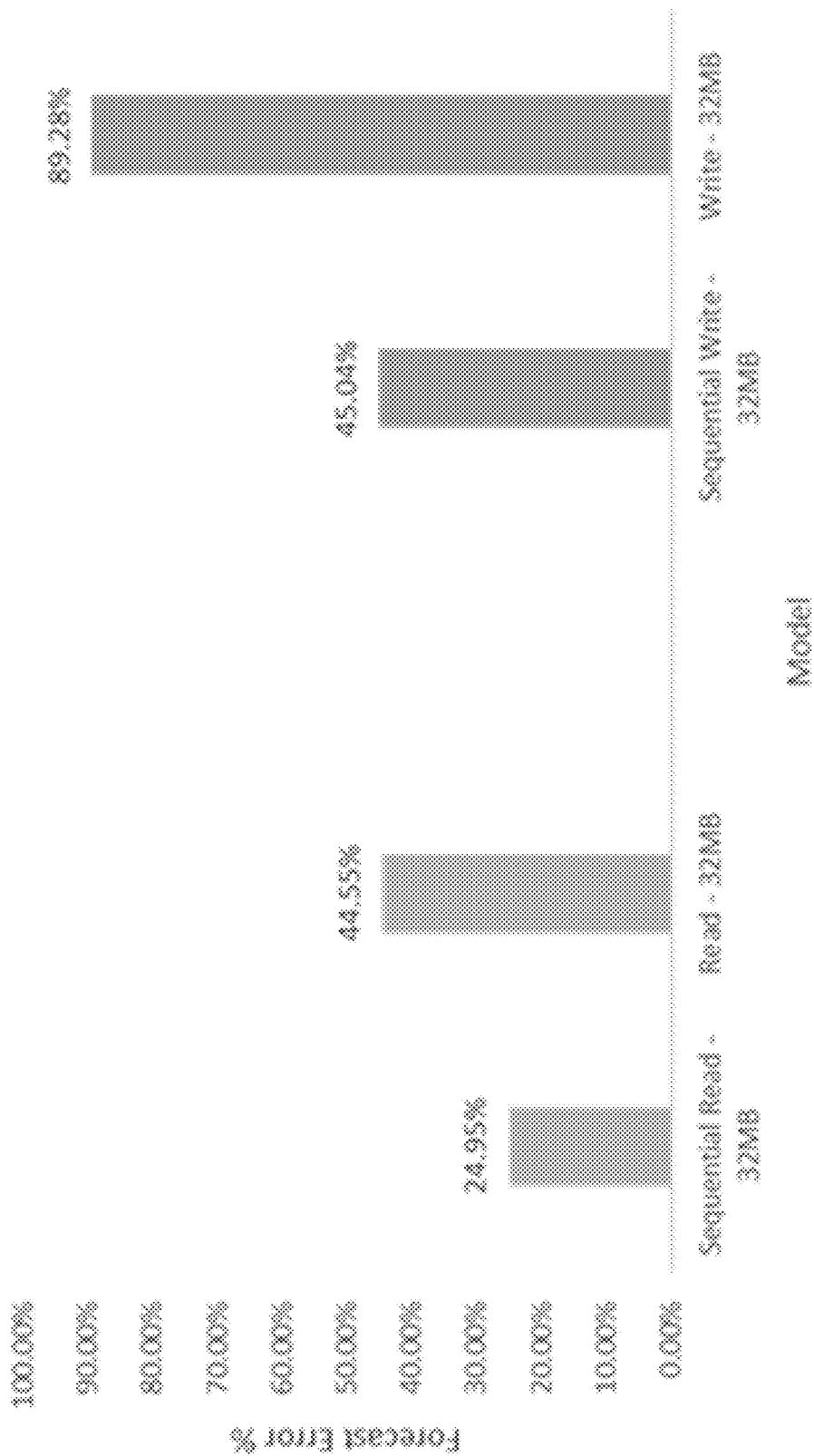

Referring again to the IO workloads as shown in FIGS. 6-7 (i.e., sequential reads and sequential writes), performance forecasting process 10 may forecast 306 IO performance data for the storage object group associated with the relatively high number of sequential read IO operations and the storage object group associated with the relatively high number of sequential write IO operations. Referring also to FIG. 10, the forecast error percentage between a generic machine learning model (or an IO machine learning model applied on all storage objects) and the specialized IO machine learning models for the sequential read IO operations and the sequential write IO operations. As shown in FIG. 10, by utilizing the specialized IO machine learning models for the storage objects with a high number of sequential read or write IO operations, the forecast error percentage is greatly reduced compared to the generic IO machine learning models. In this manner, the accuracy of IO performance forecasting is improved by utilizing the plurality of IO machine learning models for each storage object group (i.e., the storage object group associated with the relatively high number of sequential read IO operations and the storage object group associated with the relatively high number of sequential write IO operations).

In some implementations, performance forecasting process 10 may allow for IO performance to be modeled and forecasted over time. In this manner, performance forecasting process 10 may utilize the forecasted IO performance to perform some remedial action (e.g., generate an alert for a storage administrator; provide recommendations based on the forecasted IO performance; and/or automatically adjust storage system properties (e.g., add or remove allocated storage space; throttle particular IO requests at specific points in time; etc.)).

For example, performance forecasting process 10 may compare the forecasted IO performance data to one or more predefined thresholds to determine whether remedial action is warranted. The forecasted IO performance data may provide insights about the storage system's performance in terms of the host activity. For example, performance forecasting process 10 may forecast both the short-term and the long-term analysis of the IO performance data where the short-term analysis may provide the forecast for e.g., the next seven days while the long-term analysis may provide forecast results for e.g., the next year. It will be appreciated the exact scope of the "short-term" and/or the "long-term" may be individually determined for each storage system and/or each forecasting of IO performance data. In some implementations, the combined short-term and long-term forecasted IO performance data may be robust enough to support different platform types and scales to support other metrics (e.g., power consumption, processing power, device longevity, etc.).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    processing a plurality of input/output (IO) operations on a plurality of storage objects of a storage system;
    dividing the plurality of storage objects into a plurality of storage object groups based upon, at least in part, the plurality of IO operations processed on the plurality of storage objects;
    associating each storage object group with an IO machine learning model selected from a plurality of IO machine learning models, thus defining a plurality of storage object group-specific IO machine learning models, wherein each storage object group is associated with a distinct IO machine learning model; and
    forecasting IO performance data for the plurality of storage objects using the plurality of storage object group-specific IO machine learning models.

2. The computer-implemented method of claim 1, wherein processing the plurality of IO operations includes determining IO-related statistics associated with the plurality of storage objects.

3. The computer-implemented method of claim 1, wherein dividing the plurality of storage objects into the plurality of storage object groups includes dividing the plurality of storage objects into the plurality of storage object groups using a first machine learning model.

4. The computer-implemented method of claim 1, wherein dividing the plurality of storage objects into the plurality of storage object groups includes grouping the plurality of storage objects based upon, at least in part, one or more attributes associated with the plurality of storage objects.

5. The computer-implemented method of claim 1, wherein dividing the plurality of storage objects into the plurality of storage object groups includes dividing the plurality of storage objects into the plurality of storage object groups based upon, at least in part, a plurality of IO workloads from the plurality of IO operations processed on the plurality of storage objects.

6. The computer-implemented method of claim 1, wherein dividing the plurality of storage objects into the plurality of storage object groups includes clustering a plurality of IO workloads from the plurality of IO operations processed on the plurality of storage objects.

7. The computer-implemented method of claim 1, wherein forecasting IO performance data for the plurality of storage objects includes forecasting IO temperature for the plurality of storage objects, wherein forecasting the IO temperature includes forecasting a future general level of IO activity of a respective storage object.

8. A computer program product residing on a non-transitory computer readable medium having a plurality of instructions stored thereon which, when executed by a processor, cause the processor to perform operations comprising:
processing a plurality of input/output (IO) operations on a plurality of storage objects of a storage system;
dividing the plurality of storage objects into a plurality of storage object groups based upon, at least in part, the plurality of IO operations processed on the plurality of storage objects;
associating each storage object group with an IO machine learning model selected from a plurality of IO machine learning models, thus defining a plurality of storage object group-specific IO machine learning models, wherein each storage object group is associated with a distinct IO machine learning model; and
forecasting IO performance data for the plurality of storage objects using the plurality of storage object group-specific IO machine learning models.

9. The computer program product of claim 8, wherein processing the plurality of IO operations includes determining IO-related statistics associated with the plurality of storage objects.

10. The computer program product of claim 8, wherein dividing the plurality of storage objects into the plurality of storage object groups includes dividing the plurality of storage objects into the plurality of storage object groups using a first machine learning model.

11. The computer program product of claim 8, wherein dividing the plurality of storage objects into the plurality of storage object groups includes grouping the plurality of storage objects based upon, at least in part, one or more attributes associated with the plurality of storage objects.

12. The computer program product of claim 8, wherein dividing the plurality of storage objects into the plurality of storage object groups includes dividing the plurality of storage objects into the plurality of storage object groups based upon, at least in part, a plurality of IO workloads from the plurality of IO operations processed on the plurality of storage objects.

13. The computer program product of claim 8, wherein dividing the plurality of storage objects into the plurality of storage object groups includes clustering a plurality of IO workloads from the plurality of IO operations processed on the plurality of storage objects.

14. The computer program product of claim 8, wherein forecasting IO performance data for the plurality of storage objects includes forecasting IO temperature for the plurality of storage objects, wherein forecasting the IO temperature includes forecasting a future general level of IO activity of a respective storage object.

15. A computing system comprising:
a memory; and
a processor configured to process a plurality of input/output (IO) operations on a plurality of storage objects of a storage system, wherein the processor is further configured to divide the plurality of storage objects into a plurality of storage object groups based upon, at least in part, the plurality of IO operations processed on the plurality of storage objects, wherein the processor is further configured to associate each storage object group with an IO machine learning model selected from a plurality of IO machine learning models, thus defining a plurality of storage object group-specific IO machine learning models, wherein each storage object group is associated with a distinct IO machine learning model, and wherein the processor is further configured to forecast IO performance data for the plurality of storage objects using the plurality of storage object group-specific IO machine learning models.

16. The computing system of claim 15, wherein processing the plurality of IO operations includes determining IO-related statistics associated with the plurality of storage objects.

17. The computing system of claim 15, wherein dividing the plurality of storage objects into the plurality of storage object groups includes dividing the plurality of storage objects into the plurality of storage object groups using a first machine learning model.

18. The computing system of claim 15, wherein dividing the plurality of storage objects into the plurality of storage object groups includes grouping the plurality of storage objects based upon, at least in part, one or more attributes associated with the plurality of storage objects.

19. The computing system of claim 15, wherein dividing the plurality of storage objects into the plurality of storage object groups includes dividing the plurality of storage objects into the plurality of storage object groups based upon, at least in part, a plurality of IO workloads from the plurality of IO operations processed on the plurality of storage objects.

20. The computing system of claim 15, wherein dividing the plurality of storage objects into the plurality of storage object groups includes clustering a plurality of IO workloads from the plurality of IO operations processed on the plurality of storage objects.

* * * * *